R. LOCKWOOD.
India-Rubber Eraser.
No. 167,455.
Patented Sept. 7, 1875.
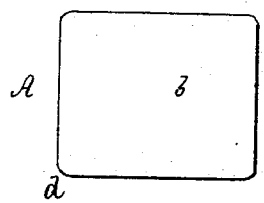
Fig. 1.
 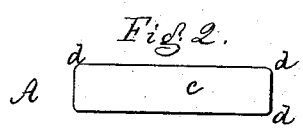 
Fig. 5.  Fig. 2.  Fig. 6.
Fig. 3.
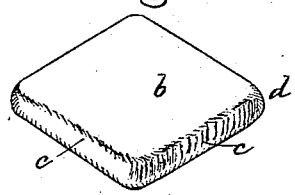
Fig. 4.
Witnesses.
W. J. Pratt.
L. H. Latimer.
Inventor.
Rhodes Lockwood
PER Crosby Gregory Att'ys.

UNITED STATES PATENT OFFICE.

RHODES LOCKWOOD, OF BOSTON, MASSACHUSETTS.

IMPROVEMENT IN INDIA-RUBBER ERASERS.

Specification forming part of Letters Patent No. 167,455, dated September 7, 1875; application filed June 24, 1875.

*To all whom it may concern:*

Be it known that I, RHODES LOCKWOOD, of Boston, in the county of Suffolk and State of Massachusetts, have invented an Improvement in India-Rubber Erasers, of which the following is a specification:

This invention relates to erasers made of india-rubber for the purpose of erasing lead-pencil and other marks; and consists in an eraser having a soft, abraded, ground, or roughened surface, whereby the eraser is adapted to act at once on the lead-pencil or other mark, thereby avoiding the necessity of cutting or rubbing the block of india-rubber to secure a proper surface for erasive purposes.

Blocks and pieces of india-rubber as now made present square corners, and their outer portions are hard and smooth, owing to the action of the powder used on the rubber sheet during vulcanization. These blocks do not operate properly to remove the lead-pencil marks until the glazed or hardened or smooth surface of the rubber block is worn off, or the corner is ground away, so as to produce a soft surface, and persons using these blocks or pieces of rubber usually cut away the corners with a knife, and then gradually, by rubbing, wear away the hard or uneven surface until a proper soft or velvet-like erasing-surface is procured.

The object of my invention is to produce a rubber eraser, which is adapted to rub out lead-pencil or other marks, and which, as manufactured, presents soft surfaces and rounded corners. New pieces of rubber operate very badly until worn away, and consequently old pieces, when much worn, are considered best for erasive purposes.

Figure 1 represents a top view of a block of rubber; Fig. 2, an edge view; Fig. 3, an edge view of a modified form; Fig. 4, a perspective view of an eraser; and Figs. 5 and 6, represent erasers adapted to pencils and holders.

A represents a rubber eraser (shown as a block of india-rubber) of usual form; but instead of being in the form shown it may be of any other well-known form, or as shown at Figs. 5 and 6. The rubber to form the eraser is compounded and prepared in any well-known or suitable way, is cut in blocks or other shapes of proper or desired size, and then the erasers are placed, a number of them together, loosely in a barrel or revolving box, and tumbled, until by their action one on the other the corners $d$ and edges are worn away or rounded, leaving each eraser with a soft velvet-like finish over its entire surface, ready for immediate and effective use. In forming these blocks they have heretofore usually been so cut that the sides presented a corrugated face. This is done because it is thought that these corrugations assist the process of forming rounded corners, as the block is worn away at the corners. Such an edge is shown at Fig. 3.

With this, my improved block, the edges $c$ are cut smooth, as shown at Figs. 1 and 2; but the edges might be corrugated as usual, as represented in Fig. 3. When subjected to this tumbling action for a sufficient length of time, the blocks, with smooth faces $b$ and sides $c$, and rounded corners $d$, are found to present an exterior surface, every part of which is at once adapted as a most effective eraser, and the corners and edges have easy rounded curves.

A block with corrugated sides has its corners and square edges abraded or worn off, as shown at 3, and such corners and the flat side $a$ of the block are soft and fully effective as erasing-surfaces.

Some erasers are made as cylindrical blocks, to be held in holders, or to be attached to or to form part of lead-pencils. All these different kinds of erasers may be tumbled and abraded, or ground away, as described, to produce ready-acting erasers.

Instead of tumbling the erasers, as described, they might be ground away uniformly by other means, so as to present proper erasing faces and corners. An eraser prepared in this way is very durable, is always ready, and is more effective than an ordinary eraser, such as are now made.

The surface of an eraser prepared in this way feels soft, like velvet, and I denominate the rubber velvet rubber.

I lay no claim to the shape of the rubber blocks herein shown.

I claim—

As a new article of manufacture, a rubber eraser, having soft finished erasive surfaces, all substantially as described.

In testimony whereof I have signed my name to this specification in the presence of two subscribing witnesses.

RHODES LOCKWOOD.

Witnesses:
G. W. GREGORY,
S. B. KIDDER.